United States Patent [19]
Mutoh et al.

[11] Patent Number: 5,549,172
[45] Date of Patent: Aug. 27, 1996

[54] ELECTRIC VEHICLE DRIVE SYSTEM AND DRIVE METHOD

[75] Inventors: Nobuyoshi Mutoh, Katsuta; Ryoso Masaki; Taizou Miyazaki, both of Hitachi; Fumio Tajima, Juou-machi; Tsutomu Ohmae, Hitachi, all of Japan

[73] Assignee: Hitachi, Ltd., Tokyo, Japan

[21] Appl. No.: 234,424

[22] Filed: Apr. 28, 1994

[30] Foreign Application Priority Data

Apr. 28, 1993 [JP] Japan .................................. 5-102154

[51] Int. Cl.$^6$ ...................................................... B60K 1/02
[52] U.S. Cl. ........................................ 180/65.1; 180/65.6
[58] Field of Search ................................. 180/65.1, 65.6, 180/65.8, 65.3

[56] References Cited

U.S. PATENT DOCUMENTS

| | | |
|---|---|---|
| 4,010,407 | 3/1977 | Lombard . |
| 4,099,589 | 7/1978 | Williams . |
| 5,099,186 | 3/1992 | Rippel et al. . |
| 5,148,883 | 9/1992 | Tanaka et al. . |

FOREIGN PATENT DOCUMENTS

| | | |
|---|---|---|
| 0496059 | 7/1992 | European Pat. Off. . |
| 0577980 | 1/1994 | European Pat. Off. . |
| 53-016815 | 2/1978 | Japan . |
| 60-035905 | 2/1985 | Japan . |
| 2-133005 | 5/1990 | Japan . |
| 2235836 | 3/1991 | United Kingdom . |

OTHER PUBLICATIONS

Japan Abstract No. JP 4183206, vol. 16, No. 498 (M–1325), Oct. 15, 1992.

*Primary Examiner*—Richard M. Camby
*Attorney, Agent, or Firm*—Evenson, McKeown, Edwards & Lenahan, P.L.L.C.

[57] ABSTRACT

The object of the present invention is to provide an electric drive system which ensures effective generation of torque from the start to the maximum speed, and extended cruising distance and upgraded running performances. The drive system according to the present invention is characterized in that, in a electric vehicle to be driven by the wheels which are driven by the rotary output of two or more motors, said two or more motors comprise at least two different types of motors, and the system is provided with the control means to adjust the share of the vehicle driving force to be generated by each of said motors in conformity to the running state of said vehicle. These two or more motors comprise a combination of a low speed drive motor and high speed drive motor, and a highly efficient motor is used as said low speed motor, while a motor having a greater capacity and greater base speed than said low speed drive motor is used as the high speed drive motor. The share of the driving force of said vehicle is controlled by the control means such that up to the maximum torque is generated by said low speed drive motor, with the remaining torque generated by said high speed drive motor.

24 Claims, 16 Drawing Sheets

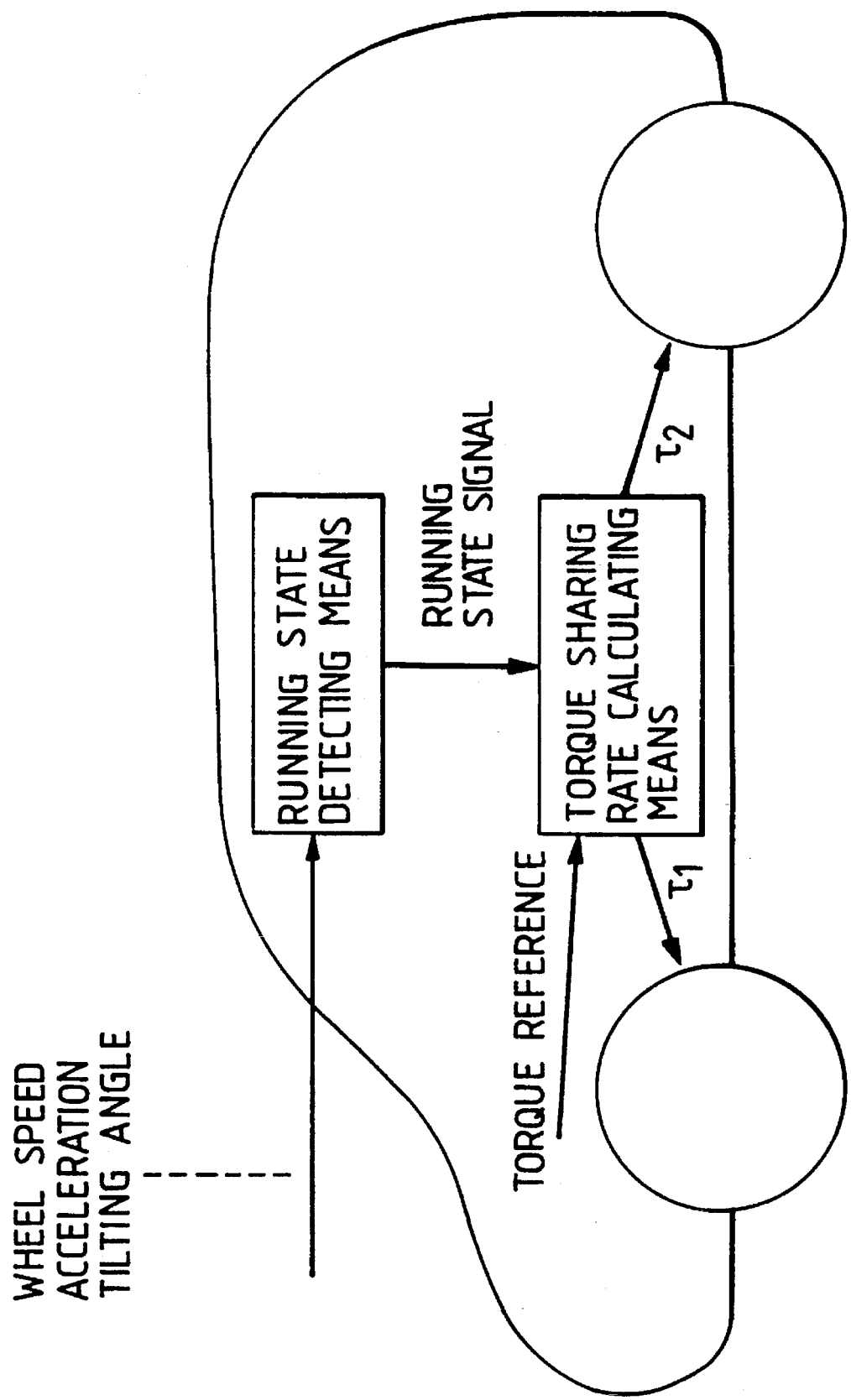

SPEED/TORQUE CHARACTERISTIC FOR LOW SPEED MOTOR

SPEED/TORQUE CHARACTERISTIC FOR HIGH SPEED MOTOR

DRIVE METHOD SWITCHING MAP

FIG. 6

COMBINATIONS OF DIFFERENT TYPES OF MOTORS (EXAMPLE)

| COMBINATIONS OF DIFFERENT TYPES OF MOTORS (UPPER STAGE: MOTOR FOR DRIVING IN LOW SPEED REGIONS) (LOWER STAGE: MOTOR FOR DRIVING IN HIGH SPEED REGIONS) | MODE 1 | MODE 2 | MODE 3 | COMPARISON OF MAXIMUM TORQUES |
|---|---|---|---|---|
| SM/IM | SM | SM+IM | IM | SM<IM |
| IM1/IM2 | IM1 | IM1+IM2 | IM2 | IM1<IM2 MOTORS WITH DIFFERENT NUMBER OF POLES |
| IM/RM | IM | IM+RM | RM | IM<RM |
| DCM/IM | DCM | DCM+IM | IM | DCM<IM |
| SM/RM | SM | SM+RM | RM | SM<RM |
| DCM/RM | DCM | DCM+RM | RM | DCM<RM |

FIG. 8(a)

FRONT WHEEL MOTOR EFFICIENCY MAP (UNIT:%)

| TORQUE (Nm) \ SPEED (min$^{-1}$) | 500 | 1000 | 1500 | ----- |
|---|---|---|---|---|
| 20 | 53 | 68 | 72 | ----- |
| 40 | 61 | 75 | 79 | ----- |
| 60 | 67 | 78 | 83 | ----- |
| ⋮ | ⋮ | ⋮ | ⋮ | |

FIG. 8(b)

REAR WHEEL MOTOR EFFICIENCY MAP (UNIT:%)

| TORQUE (Nm) \ SPEED (min$^{-1}$) | 500 | 1000 | 1500 | ----- |
|---|---|---|---|---|
| 20 | 60 | 67 | 70 | ----- |
| 40 | 65 | 70 | 75 | ----- |
| 60 | 67 | 73 | 79 | ----- |
| ⋮ | ⋮ | ⋮ | ⋮ | |

5,549,172

ELECTRIC VEHICLE DRIVE SYSTEM AND DRIVE METHOD

BACKGROUND OF THE INVENTION

1. Field of the Invention

The present invention relates to the electric vehicle drive system, especially to the electric vehicle drive system capable of improving the running performance.

2. Description of the Prior Art

As disclosed in the Official Gazette of Japanese Patent Application Laid-open NO. 133005-1990, the conventional electric vehicle drive system is known to be available in the following types;

a system wherein either the front or rear wheels are driven by two or more motors, a system where each of the front and rear is provided with one motor to form a four-wheel drive, and a system where each of the wheels is driven. Each of them is a drive system comprising a combination of one or more motors of the same type or the same capacity where two or more motors are controlled to produce the same output at all times.

In said technique, the drive efficiency depends on the characteristics of each motor used even when two or more motors are used. For example, when the motor featuring an excellent torque generating efficiency is used in the low speed range, efficient drive capacity cannot be gained in the high speed range even when two or more motors are combined. Conversely, efficiency in the low speed range is reduced by using the motor featuring an excellent torque generating efficiency in the high speed range. This means that drive performances cannot be upgraded over all speed ranges.

Furthermore, the drive system composed of two or more motors of the same type, increases the motor space and curb weight than the drive system using only one motor; this is not advantageous for design configuration of the electric vehicle.

When the drive system is composed of two or more motors so that power is supplied from the battery of the same system, it will be damaged by short-circuiting if any power device of the power converter in said system is damaged. This will cause a short circuit to be formed in the power converter, and short circuit current to flow. So the brake torque is produced until the faulty power device is burnt or the fuse in the circuit is blown and opened.

SUMMARY OF THE INVENTION

The object of the present invention is to provide an electric vehicle drive system featuring an extended cruising distance and upgraded running performances by ensuring an efficient generation of the torque from the start to the maximum speed by a combination of two or more motors.

Another object of the present invention is to provide an electric vehicle drive system featuring a fail safe function which ensures the vehicle to be running even when a failure has occurred to the drive system.

A further object of the present invention is to provide an electric vehicle with a practical drive system featuring overall curb weight.

To achieve said objects, the electric vehicle drive system according to the present invention is characterized in that two or more motors are composed of at least two different types of motors and a control means is provided to control the share of the drive force of the wheels to be Generated by each of said motors in conformity to the running state of said vehicle, when the vehicle is driven by the wheels run by the torque of two or more motors.

The present invention is further characterized by said two or more motors comprising a combination of the motor for low speed drive and the motor for high speed drive, wherein said motor for low speed drive is efficient, and said motor for high speed drive has a Greater capacity and Greater base speed than said motor for low speed drive; furthermore, said control means operates to ensure that said motor for low speed drive is loaded up to the maximum torque, with the remaining load shared by said motor for high speed drive.

The present invention is further characterized by a drive system wherein two or more motors of different types are mounted on the front or rear wheels or on the front and rear wheels, and control is made to determine the ratio of the drive torque generation to be shared by each of the two or more motors which is required according to the running state of the electric vehicle, so that torque will be Generated by each motor according to the ratio.

The motor can be classified into different types according to methods to Generate magnetic flux in the motor, capacity or volume of the motor. For example, according to the magnetic flux generating methods, the motor can be classified into a permanent magnet synchronous motor, induction motor, reluctance synchronous motor, series field DC motor and shunt field DC motor. According to the capacity and volume, they can be divided into motors having different numbers of phase and poles and different diameters of armatures and stators.

To constitute a combination of different types of motors to provide a preferred embodiment for the present invention, the permanent magnet synchronous motor is used as the motor for low speed drive, while the induction motor is used as the motor for high speed drive. In addition, a combination of different types of motors uses two or more of any of the following motors; the inductor motor with different number of phases, the inductor motor with different number of poles, permanent magnet synchronous motor, reluctance synchronous motor, series field DC motor and shunt field DC motor.

According to the preferred embodiment of the present invention, the torque generated by the motor is controlled by the controller of the electric vehicle;

The torque reference is calculated based on the reference signals corresponding to accelerator opening, advance, start and retreat obtained by the accelerator, pedal brake and drive mode shift lever operated by each driver and the rotating angle speed signal of said motor, and is sent into the torque control unit. The control unit calculates the torque generation to be shared by both motors in the motoring power required by the electric vehicle. Said torque is output as torque reference from the vehicle control unit. The torque reference is fed into the motor control unit, so that the motor torque is controlled to conform to the torque reference.

BRIEF DESCRIPTION OF DRAWINGS

In the accompanying drawing:

FIG. 2 is a drawing illustrating the principle of torque sharing method between the front and rear wheels in the drive system according to the present invention;

FIG. 6 is a diagram illustrating an example of a combination of different types of motors and distribution of torque to each motor;

FIG. 8 is a diagram illustrating the drive efficiency map in another embodiment of the present invention;

DETAILED DESCRIPTION

The following describes the embodiments of the present invention.

Figure 1:
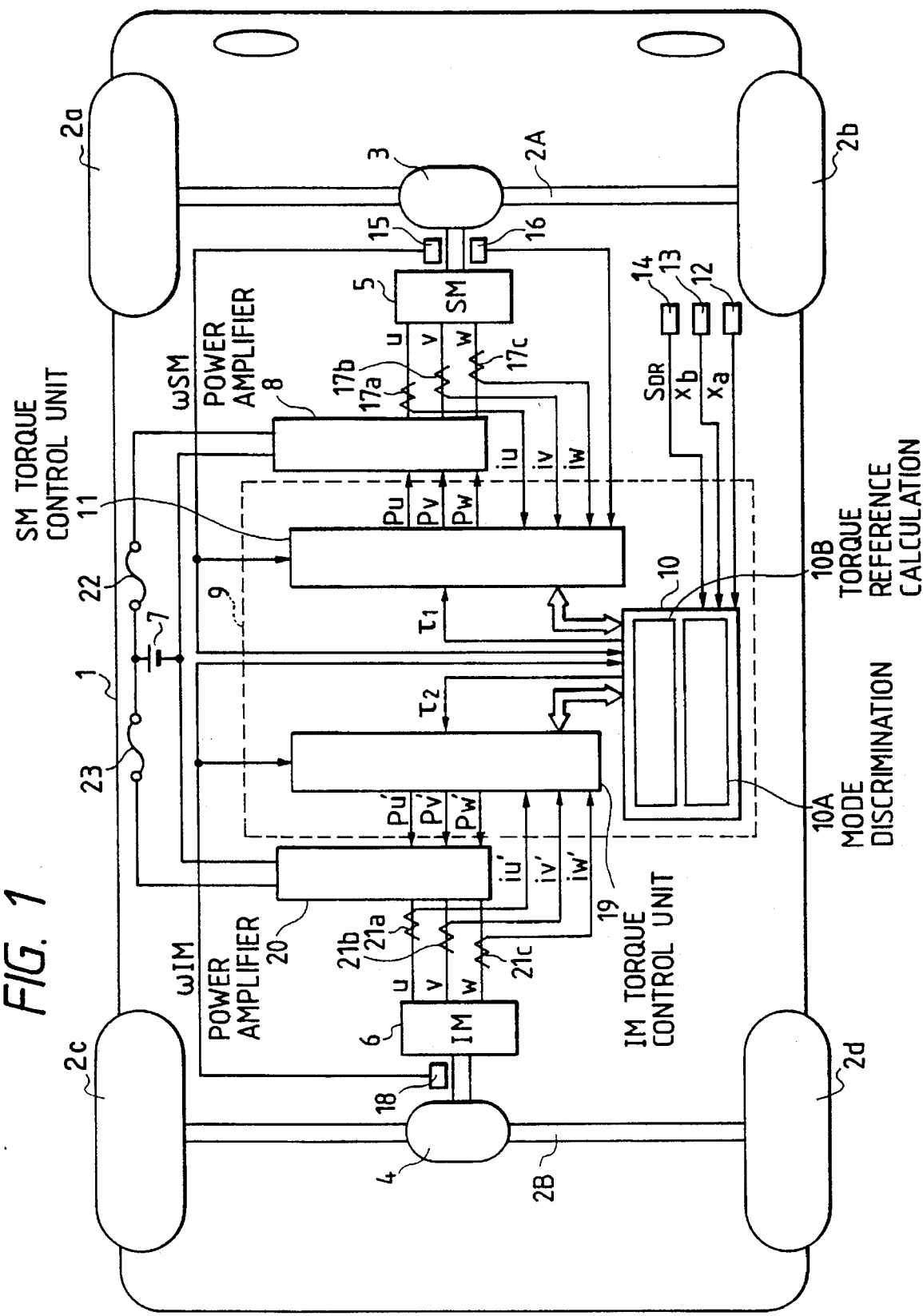
FIG. 1 is a drive circuit diagram representing an electric vehicle drive system according to the present invention.

FIG. 1 shows an embodiment of the electric vehicle drive system with different motors mounted on front and rear wheels. In the electric vehicle according to this embodiment, front wheels 2a and 2b and rear wheels 2c and 2d are installed on vehicle body 1, and the front wheel is provided with permanent magnet synchronous motor (SM) 5 and induction motor (1M) 6. Axles 2A and 2B of these front and rear wheels are provided with differential gears 3 and 4, respectively, and torque generated by motors 5 and 6 is transmitted to the axle through said gears. Motors 5 and 6 is driven by power amplifiers 8 and 20 which converts direct power supplied from the battery 7 to the alternating power. It should be noted that the generic term of power converter or inverter corresponding to the power amplifiers 8 and 20 may be used, but the following description uses power amplifier as a term to include conversion from direct power to the direct power.

Torque generated by permanent magnet synchronous motor 5 is controlled by vehicle control unit 10 in the controller 9 of the electric vehicle and synchronous motor torque control unit 11. Furthermore, torque generated by induction motor 5 is controlled by vehicle control unit 10 and induction motor torque control unit 19. Vehicle control unit 10 is provided with mode judging means 10A and torque reference calculating means 10B, and uses via the technique discussed later to determine the torque reference $\tau_1$ and $\tau_2$ to be generated respectively by front wheel motor 5 and rear wheel motor 6.

Accelerator operation ratio Xa, brake application ratio Xb, and advance, start and retreat reference signals $S_{DR}$ are input into mode judging means 10A of vehicle control unit 10 via accelerator pedal 12, brake pedal 13 and operation mode shifter lever 14 operated by the driver. The mode is identified on the basis of these signals and the output signal from speed detector 15 to detect the rotating angle speed of the motor 5. Based on this result, torque reference $\tau_1$ is calculated by torque reference calculating means 10B, and the result is sent to the synchronous motor torque control unit 11. Synchronous motor torque control unit 11 determines the amplitude $I_t$ of the primary current of the synchronous motor according to the torque reference $\tau_1$ and the output signal of rotary angle detector 16 to detect the rotary angle position, as shown in the following equation (1)

$$I_t = K_{SM} \cdot \tau_1 \tag{1}$$

where $K_{SM}$: constant related to motor $$i_u^* = I_t \cos (\int \omega_1^* \cdot dt)$$

$$i_v^* = I_t \cos (\int \omega_1^* \cdot dt - 2\pi/3)$$

$$i_w^* = I_t \cos (\int \omega_1^* \cdot dt + 2\pi/3) \tag{2}$$

$$\omega_1^* = \omega_{SM} \text{ (: rotary angular speed of motor 5)} \tag{3}$$

where the timing for starting integration in equation (2) is determined by the rotary angle (corresponding to the position of magnetic pole) of the rotor of permanent magnet synchronous motor 5 detected by rotary angle detector 16. Namely, we get temporary phase $\Theta_{1*}$ (=$\int \omega_{1*}$.dt) which is changed synchronous to the rotary angle of the rotor. Standard signals Pu, Pv and Pw to be applied to the gate of power device (not illustrated) of power amplifier 8 is produced in synchronous motor torque control unit 11, so that primary currents $i_u, i_v, i_w$, which flows to the primary winding coil of permanent magnet synchronous motor 5 and which is detected by current sensors 17a, 17b and 17c, will agree with the primary current reference $i_{u*}, i_{v*}, i_{w*}$, expressed in equation (2). This operation causes permanent magnet synchronous motor 5 to generate the torque which constantly agrees with torque reference $\tau_1$.

Of the motoring power required by the electric vehicle, the torque generation to be shared by the rear wheel is calculated by the torque reference calculating means 10B of vehicle control unit 10, and the result is output as torque reference $\tau_2$. This torque reference $\tau_2$ is sent to induction motor torque control unit 19, and the torque is controlled to agree with said torque reference $\tau_2$. That is, torque reference $\tau_2$ and the rotary angle $\omega_{IM}$ of induction motor 6 obtained by a speed detector 18 is sent to induction motor torque control unit 19 to control the torque generated by induction motor 6 on the rear side, as follows:

Firstly, the system detects the currents $i_u', i_v', i_w'$ flowing to the primary winding coil of induction motor 6 from current sensors 21a, 21b and 21c, and said currents are subjected to d-q axis coordinate conversion, thereby calculating magnetic current $I_m$ and torque current $I_t'$ according to the following equation:

$$Im = \sqrt{(2/3)} \cdot \{i_u' \cdot \cos (\theta_1^*) + i_v' \cdot \cos (\theta_1^* - 2\pi/3) + \tag{4}$$

$$I_t' = \sqrt{(2/3)} \cdot \{i_u' \cdot \sin(\theta_1^*) + i_v' \cdot \cos(\theta_{1*} - 2\pi/3) + i_w' \cdot \cos(\theta_1^* + 2\pi/3)\} \quad (5)$$

$$i_w' \cdot \sin(\theta_1^* + 2\pi/3)\}$$

$$\tau = m \cdot p \cdot (1_m'^2/(1_m' + 1_2)) \cdot I_m \cdot I_t' \quad (6)$$

where m represents number of phases, p denotes the number of poles of the induction motor, and $1_{m'}$ and $1_2$ shows magnetic inductance and secondary leakage inductance.

Then, operating value $\tau^*$ of the torque reference is determined such that torque $\tau$ generated by the induction motor will agree with torque reference $\tau_2$. Based on this operating value $\tau^*$, the primary current reference $i_{u*}'$, $i_{v*}'$, $i_{w*}'$ is calculated.

Firstly, the secondary magnetic flux $\phi_2$ is obtained from equation (7).

$$\phi_2 = l_m' \cdot I_m / (1 + T_2 \cdot s) \quad (8)$$

where $T_2$ represents secondary time constant, and s denotes Laplace operator.

$$I_t'^* = \tau^*/m \cdot p \cdot \phi_2 \quad (8)$$

$$\omega s = \{r_2/(l_m' + l_2)\} \cdot I_t'^*/I_m^* \quad (9)$$

where $r_2$ stands for secondary resistance, and $I_{m*}$ shows the magnetizing current reference to be determined such that secondary magnetic flux $\phi_2$ will agree with secondary magnetic flux setting value $\phi_{2*}$.

$$\psi = \arctan(I_t'^*/I_m^*) \quad (10)$$

$$I_1^* \cdot I_1^* = I_t'^* \cdot I_t'^* + I_m^* \cdot I_m^* \quad (11)$$

Equation (12) is obtained by expressing the primary current command in terms of amplitude $I_{1*}$, phase $\psi$ and angular frequency $\omega_1^*$.

$$i_u^* = I_1^* \cdot \cos(\int \omega_1^* \cdot dt + \psi)$$

$$i_v^* = I_1^* \cdot \cos(\int \omega_1^* \cdot dt + \psi - 2\pi/3)$$

$$i_w^* = I_1^* \cdot \cos(\int \omega_1^* \cdot dt + \psi + 2\pi/3) \quad (12)$$

Next, the reference signal (not illustrated) of the primary voltage is obtained such that primary currents $i'_u$, $i'_v$, $i'_w$ will agree with said currents $i_{u*}$, $i_{v*}$, $i_{w*}$, and comparison is made between the reference signal of said primary currents the triangle wave (carrier wave) to form PWM signals $P'_u$, $P'_v$ and $P'_w$. Said signals are used to generate the gate signal to be applied to power device gate of power amplifier 20, and said power amplifier 20 is controlled by this gate signal.

The numeral 22 and 23 represent the breakers including fuses. In the event that a short circuit loop is formed in either the power transmission system for the front drive motor or power transmission system for the rear drive motor by the power devices of power amplifiers 8 and 20 having turned on for some failure, these breakers causes this short circuit loop to be opened.

Torque $\tau_1$ and $\tau_2$ required for front wheels 2a and 2b and rear wheels 2c and 2d is obtained by vehicle control unit 10. Torque to be distributed to the rear wheel before this is determined by the running state of the electric vehicle. The following describes the concrete technique with reference to the drawing.

FIG. 2 shows the principle of drive torque sharing. The running state is captured according to front and rear wheel speeds, the differential of wheel speeds, acceleration, vehicle body inclination angle, internal state in the drive system, especially the battery voltage and current, and temperature of the power amplifier (inverter operation in this case) and motor. The running state used under this context should be interpreted to mean the running state on the up-grade hill and down-grade hill, acceleration and deceleration (during brake operation), the state of the road surface (roads covered with snow and rain, bad roads), the state of the front or rear wheels being disengaged, running state on congested roads and high speed running state.

Based on the above values, the system determines the running state; then the torque reference in driven state issued from the accelerator is distributed into torque reference to be issued by the front wheel drive motor and that to be issued by the rear wheel drive motor.

Combinations of different types of motors should be considered so as to ensure that mutual characteristics between motors can be compensated over an extensive range by combination of different types of motors, resulting in improved performances and functions of the entire drive system.

Table 1 shows the types and characteristics of the motors. The important characteristics required of the drive system of the electric vehicle are mechanical strength, motor efficiency, torque generating efficiency in particular, productivity and maintainability. Mechanical strength is an important factor in evaluating safety in collision and high speed drive, and the torque generating efficiency of the motor is important in evaluating the running distance per charging.

TABLE 1

| Item | Motor types |
| --- | --- |
| Mechanical strength | DCM, SM < IM < RM |
| Efficiency | RM < IM* < IM** < DCD < SM (See Note). |
| Productivity | DCM < SM < IM < RM |

Note: The number of poles of IM* is smaller than that of IM**.
DCM: DC motor
RM: reluctance motor
IM: induction motor
SM: permanent magnet synchronous motor Firstly, mechanical strength is evaluated; it differs according to the rotor structure. The reactance motor (RM) has the greatest strength since the rotor can be made of the blanked steel plate. This motor is followed by induction motor (IM) with the rotor bar built into the rotor, the permanent magnet synchronous motor (SM) provided with the rotor structure to protect the rotor magnet against being disassembled by the centrifugal force, and DC motor (DCM) subjected to structural restriction due to the commutator, with mechanical strength being reduced in that order.

Efficiency differs according to whether or not the motor is provided with a means of forming magnetic flux (permanent magnet).

The synchronous motor and DC motor having a permanent magnetic to form magnetic flux are more efficient than the induction motor and reluctance motor which requires magnetizing current to be fed in order to form magnetic flux. Of the same motors having the permanent magnet, the permanent magnet synchronous motor has higher efficiency by the absence of friction loss. Of the induction motors, the motor having a greater number of poles has greater flux density; hence higher torque generation rate. For the rotor structure, the reluctance motor has poor power factor than the induction motor; hence poorer efficiency.

Regarding productivity, the reluctance motor having the simplest rotor structure is the best, and is followed by the induction motor, permanent magnet synchronous motor and DC motor, with productivity decreasing in that order.

The induction motor is available in the squirrel cage type and wound rotor type, and they will be treated as motors of different types in the following description. Furthermore, the motor of the multiple winding structure where the primary winding coil is made multiple so that it can be taken out to the terminal is also treated as a motor of different type. This is because new functions can be added to the drive system for these structural characteristics; for example, during running, power can be take out of the terminals of these primary winding coils, while power can be supplied to the battery through the terminals when the vehicle is stopped.

Furthermore, a combination of two or more motors having different capacities to drive the same wheels (front or rear) is also regarded as a combination of different types of motors. Such a combination allows the desired torque characteristics to be supplied to the drive system; moreover, the motor output capacity can be reduced compared to the case where torque characteristics are obtained from one motor, resulting in reduced curb weight of the drive system.

As can be seen from the above discussion, the characteristics depend on the type of the motor. If these motor characteristics are combined to be complementary to each other, it is possible to get the drive system suited to the electric vehicle having the desired performance.

FIG. 3 illustrates one technique of obtaining torque sharing. In this example, the front wheel is provided with a highly efficient, small-capacity motor, for example, with a permanent magnet synchronous motor, whereas the rear wheel is provided with the motor having a higher capacity and greater base speed (wider constant torque region), for example, an induction motor.

Figure 3A:
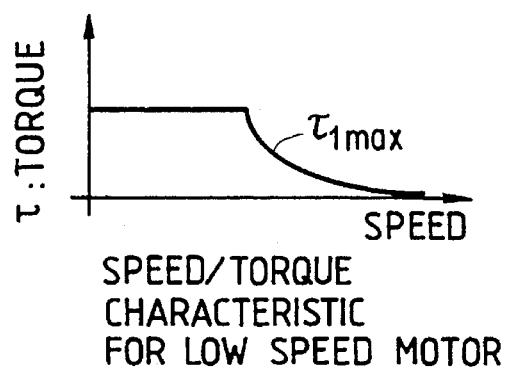
FIGS. 3(a), (b) and (c) are torque characteristics showing the drive torque sharing methods.
Figure 3B:
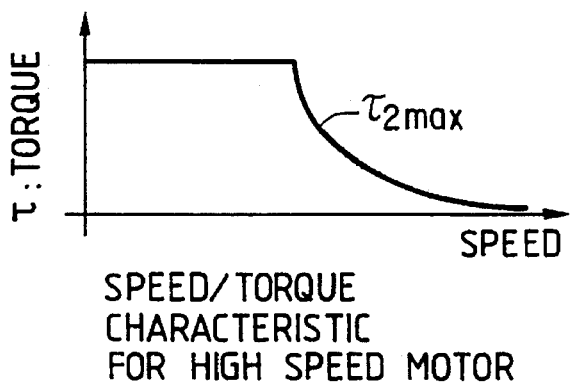

FIG. 3(a) shows the torque/speed characteristics of the permanent magnet synchronous motor, while FIG. 3(b) shows the torque/speed characteristics of the induction motor. When the front wheel speed is lower than the base speed of the synchronous motor, the synchronous motor is made to generate the drive torque $\tau$ up to the maximum torque $\tau1max$ of that motor, while the remaining torque $\tau_2$ is left to the induction motor of the rear wheel. This is expressed as:

$$\tau = \tau_1 + \tau_2 \quad 0 \leq \tau_1 \leq \tau_{1max} \quad (14)$$

This design philosophy is to ensure highly efficient generation of torque by the motor constituting the drive system at all times, by allowing the maximum torque to be generated by the highly efficient motor to produce, and remaining torque to be generated by another motor.

Furthermore, since it is generally difficult to get a highly efficient motor over the whole range of operating speed, this design philosophy intends to upgrade the overall system efficiency by a combination of highly efficient motor at a low speed and highly efficient motor at a high speed.

Figure 3C:
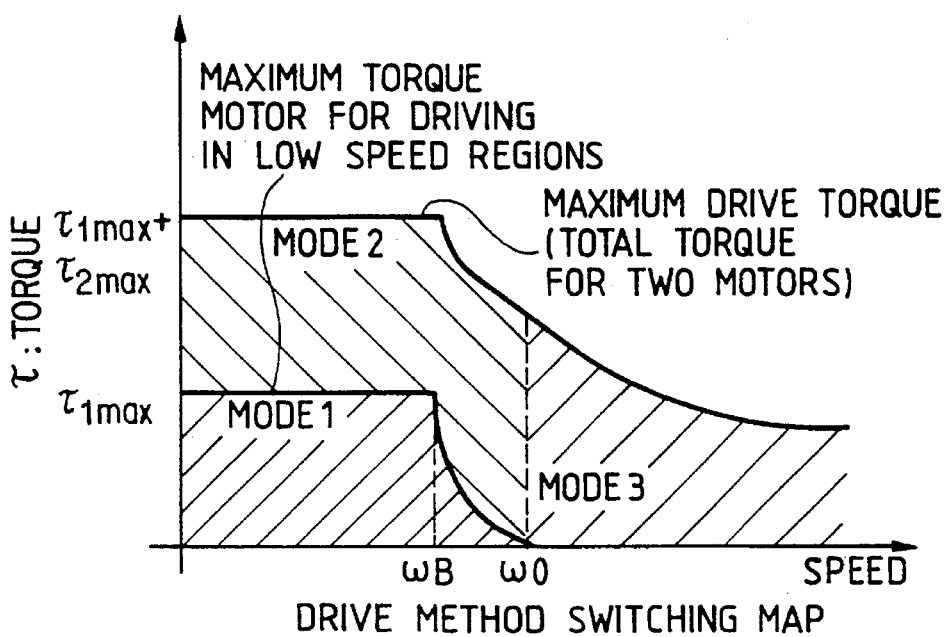

FIG. 3(c) shows an example of the operation mode suitable to the drive system in FIG. 1, namely, the drive system provided with the synchronous motor as the motor for low speed drive mounted on the front wheel, and the induction motor as the motor for high speed drive on the rear wheel.

This operation mode comprises three modes; mode 1, mode 2 and mode 3, based on which sharing of the torque generation between the front wheel motor and the rear wheel motor is switched.

In mode 1, the front wheel motor is used to generate all the torque, and in mode 2, both the front wheel motor and the rear wheel motor are used to produce the torque, while in mode 3, the rear wheel motor is used to produce the torque. Conditions for switching of these modes are given by torque reference $\tau R$ and motor speed $\omega_M$, as follows:

1) Mode 1

$$0 \leq \omega M \leq \omega 0 \text{ and } 0 \leq \tau R \leq \tau1max$$

where $\omega 0$ represents the motor speed at which the torque generated by the motor for low speed drive is reduced below the specified value, usually zero, and torque reference $\tau R = \tau 1$.

This is the case where the required torque is produced by the efficient front wheel motor (this applies to the case where efficient motor is mounted on the front wheel motor; it can be mounted on the rear wheel, where the motor on the rear wheel is the "efficient front wheel motor"). This is effective for driving during traffic congestion in streets.

2) Mode 2

$$0 \leq \omega M \leq \omega 0 \text{ and } \tau1max \leq \tau R \leq \tau2max$$

where torque $\tau R = \tau 1 max + \tau 2$

In this case, the front wheel motor produces the maximum torque $\tau1max$ at all times to ensure that the insufficient torque to meet the torque reference is compensated by the rear wheel. As a result, the maximum torque is produced by the highly efficient front wheel motor. This mode improves the overall system efficiency, as well.

3) Mode 3

$$\omega M > \omega 0$$

torque instruction $\tau R = \tau 2$

This is the case where the required torque is generated only by the rear wheel motor.

In this case, the rear wheel motor can be designed as a motor for high speed drive; this allows the motor weight to be reduced. As the result of reduced curb weight, the overall system efficiency is improved.

Figure 4:
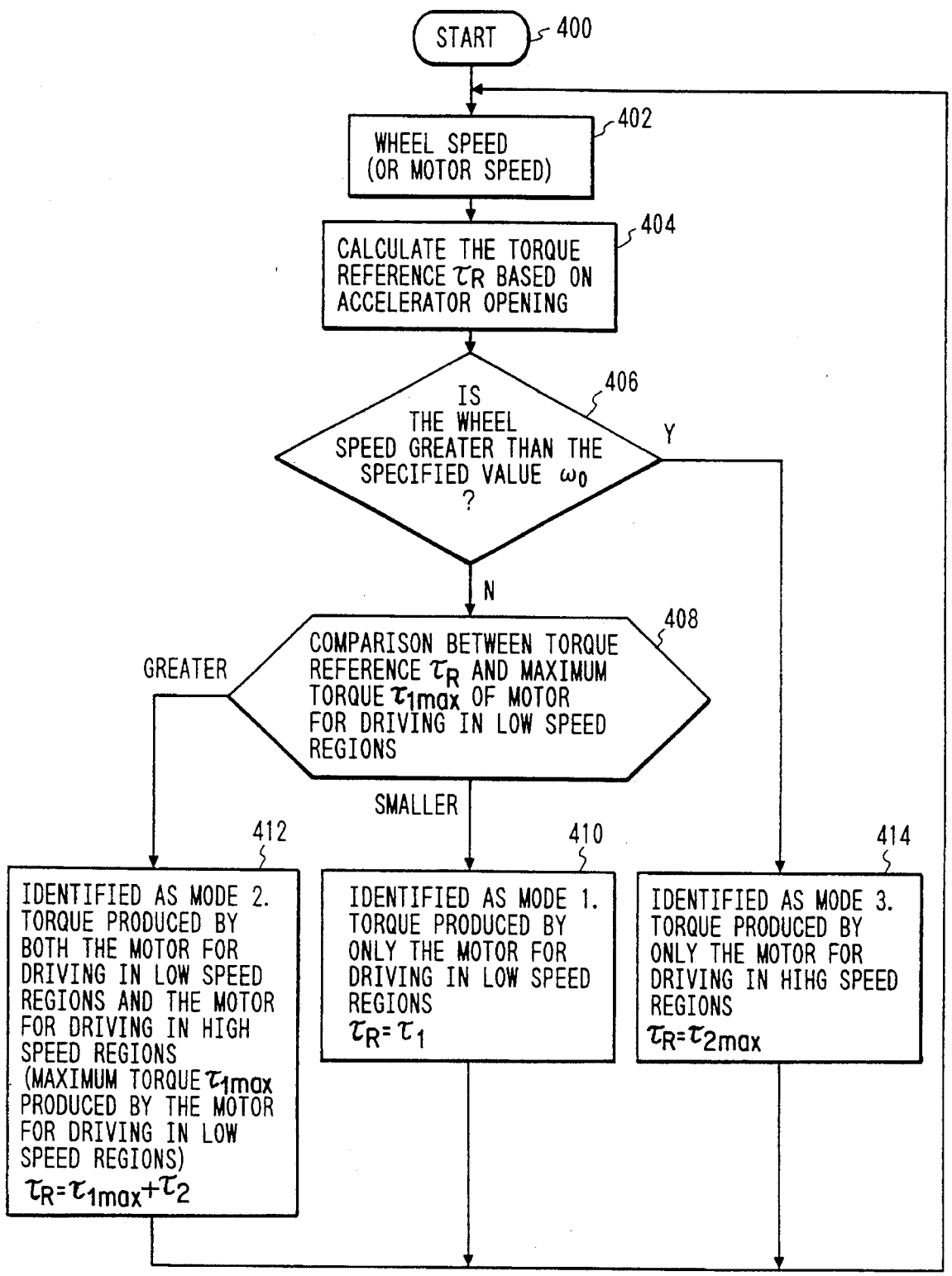
FIG. 4 is a flow chart representing the torque sharing technique when different types of motors are combined.

FIG. 4 is a flow chart representing a method to get the torque reference $\tau R$ by the above mentioned mode selection in vehicle control unit 10. The vehicle speed is detected (402) firstly. Then the torque reference $\tau R$ is calculated (404) based on the axle opening. The system determines whether or not the vehicle speed is equal to or greater than the specified value $\omega 0$ (406).

If the vehicle speed is below the specified value $\omega 0$ (406), comparison is made between torque reference $\tau R$ and the maximum torque $\tau1max$ of the motor for low speed drive (408). If the result shows that it is smaller, mode 1 is selected; while if it is greater, mode 2 is selected. The motor then generates the required torque according to this decision (410 to 414).

Figure 5:
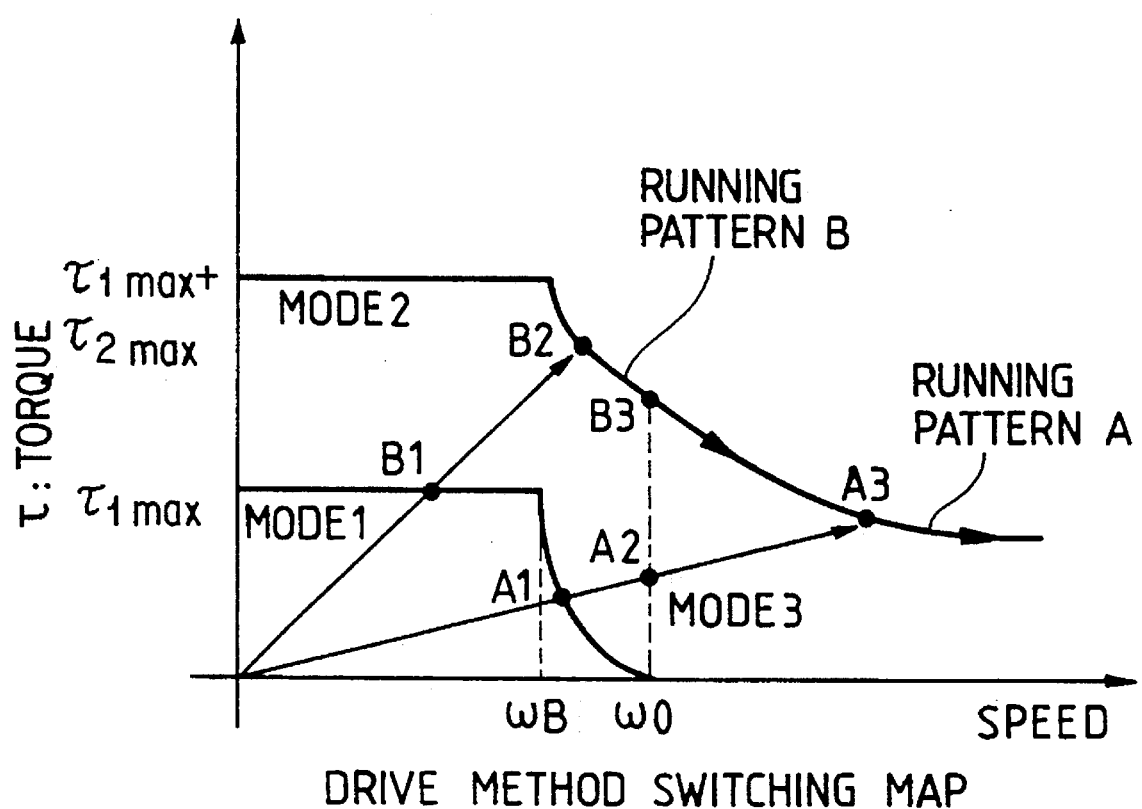
FIG. 5 is a diagram illustrating the running pattern according to the torque sharing technique given in FIG. 4.

FIG. 5 represents two types of running patterns using the above mentioned. The running pattern A shows that the vehicle is driven in mode 1 up to A1; namely, it is driven by the motor for low speed drive on the front wheel. After that, the vehicle is driven in mode 2 up to the speed of A2; i.e. by the front wheel and rear wheel. In the high speed range above A2, the mode shifts to mode 3, and the vehicle is driven only by the motor for high speed drive. From the speed of A3 upward, torque is generated along the curve of the maximum torque ($\tau2max$) which can be generated by the motor on the rear wheel. The running pattern B shows the case where acceleration is greater that in the running pattern A. The vehicle runs up to B1 in mode 1, and in mode 2 up to B2. In B2 the torque reference is increased up to the maximum torque (τ1max+τ2max) of the two motors, and from B3 the mode shifts to mode 3; then the vehicle is driven by the motor for the high speed drive on the rear wheel.

Example in FIG. 1 shows a combination between the induction motor and permanent magnet synchronous motor. It features a high efficiency over the whole speed range, permitting drive up to the high speed range. That is, the permanent magnet synchronous motor is made to provide a great constant torque (constant torque characteristic) at a low speed range, and to have constant power characteristics in the high speed range. The constant torque of the induction motor, on the other hand, is larger than the value of the constant torque characteristic of said synchronous motor, and then the range of said torque is required to cover the high speed range. This will allow the capacities of two motors to be reduced, and a large torque to be obtained at a low speed. In the range (intermediate range) where the synchronous motor torque is reduced, the torque reduced by the synchronous motor can be compensated by the torque generated from the induction motor, enabling the sense of constant acceleration to be gained. In the high speed range, it is possible to get the acceleration performance according to the constant power characteristics of the induction motor. In this drive system, permanent magnet synchronous motor ensures the vehicle to be driven in the congested traffic or uphill, without turning on the magnetizing current, thereby ensuring an extended running distance on one charge of the battery.

Furthermore, when the vehicle is driving down-hill or during deceleration, said permanent magnet synchronous motor allows the electric brake to be applied via regenerative braking, without using the magnetizing current. Moreover, regenerative energy can be recovered into the battery, permitting an efficient driving characteristics over the whole speed range.

In addition to the above mentioned combinations of motors, motor characteristics in Table 1 suggest various combinations. For example, they suggest representative combinations of the induction motor with a smaller number of poles and induction motor with a greater number of poles, between the DC motor and induction motor.

FIG. 6 shows motors to assume shares in generation of the torque in each mode in the combination of motors of different types. As standard for combination, the motor for low speed drive having higher efficiency is selected from the two combinations, while the more rugged motor for high speed drive is selected. When two induction motors are selected as a combination of different types of motors, they are composed of motors having different number of poles. The motor having a greater number of poles is selected as a motor for low speed drive, while the motor with smaller number of poles is selected as a motor for high speed drive. This is intended to avoid the following problem; the motor having a greater number of poles can be manufactured to provide greater efficiency but the motor volume is greater, causing the curb weight to increase. Generally, the motor volume is determined by the torque generated at the base speed. To reduce the volume, the base speed must be reduced, and the torque at that speed must also be reduced. To achieve this, the motor having a greater number of poles is used as a motor for low speed drive. This will ensure a greater efficiency for the total system.

It should be noted that the output capacity of the motor for low speed motor in FIG. 6 should preferably be equal to or smaller than half the output capacity of the motor for high speed drive, in order to reduce the curb weight.

Use of the motor of multiple winding structure in such a drive system will make it possible to take out the voltage generated from the terminal of each winding coil.

As characteristics of the drive system formed by the different types of motors, the drive torque can be assigned to different types of motors in conformity to the running speed; this ensures a riding comfort, safety and efficient running. The following describes how the generation of driving torque is shared.

The entire system efficiency is increased by a combination of highly efficient motor at low speeds and high efficient motor at high speeds; so it may be an effective and simple method to switch between motors for generation of the torque, depending on the wheel speed.

Figure 7:
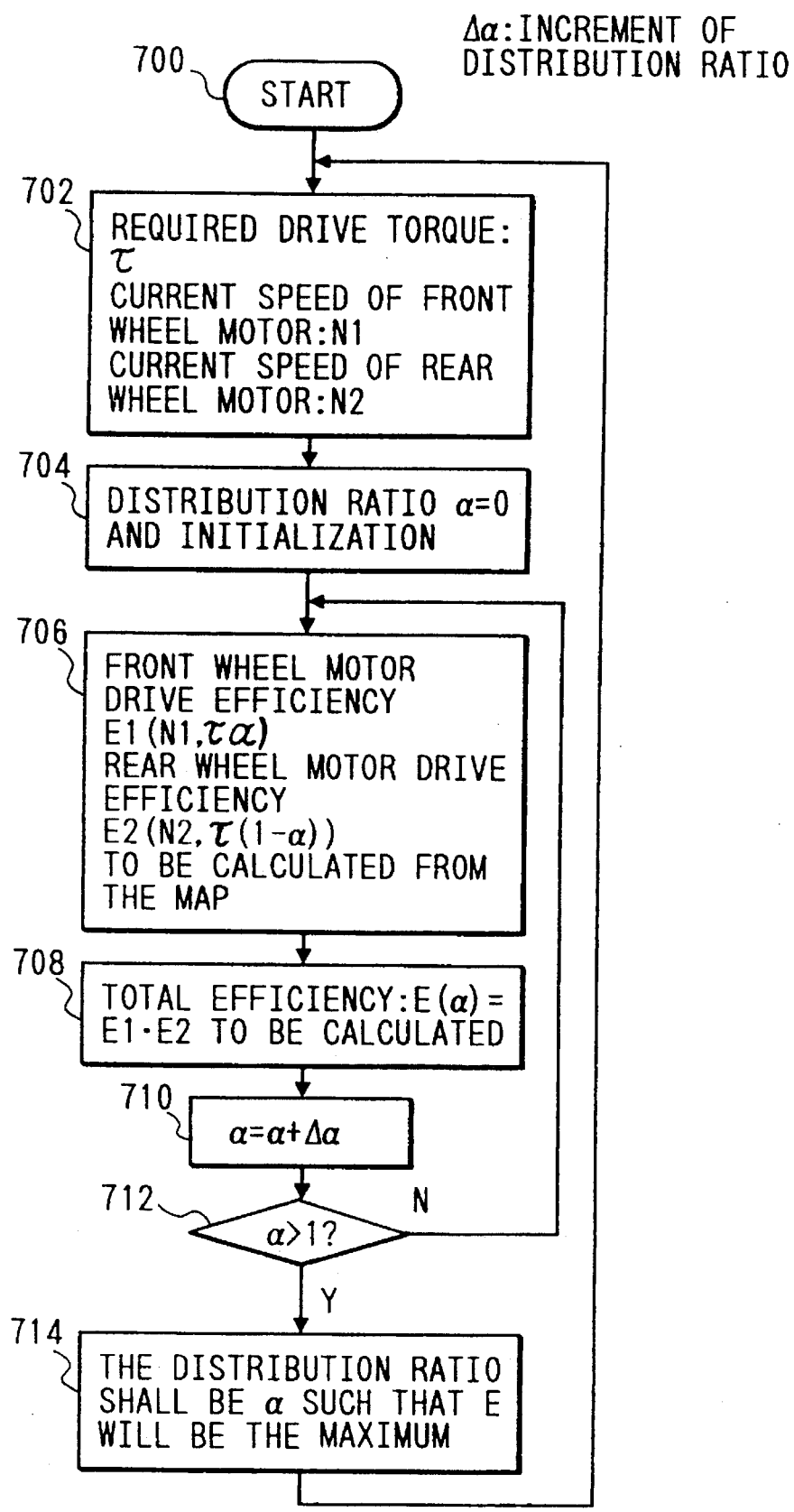
FIG. 7 is a flow chart showing the torque distribution technique given in FIG. 6.

However, the motor efficiency actually changes according to the speed. For example when the front wheel speed has exceeded the base speed of the synchronous motor, the power factor of the motor is reduced by the field weakening control. So such a one sided torque distribution measure does not always lead to the maximum efficiency of the entire system. Therefore, as shown in FIG. 8, it is also possible to prepared in advance the efficiency map corresponding to the speed and torque of the front and rear wheel drive motors, and to determine the torque distribution so that the maximum efficiency of the entire drive system can be ensured according to the procedure given in FIG. 7.

The embodiment in FIG. 1 illustrates the configuration where the motors of different types are mounted on the front and rear wheels. The motors of different types can also be mounted closer to either of the front or rear side. In these cases, a combination of motors of different types should be determined so as to compensate for the characteristics of each other, as discussed above.

When only the efficiency is to be taken into account, torque can be generated according to said technique using the motor featuring a high efficiency at all times.

Depending on the running state and drive system state, however, preference must be give to the safe running and riding comfort.

In such cases, it is advisable to use only the front or rear wheel to drive the vehicle.

Figure 9A:
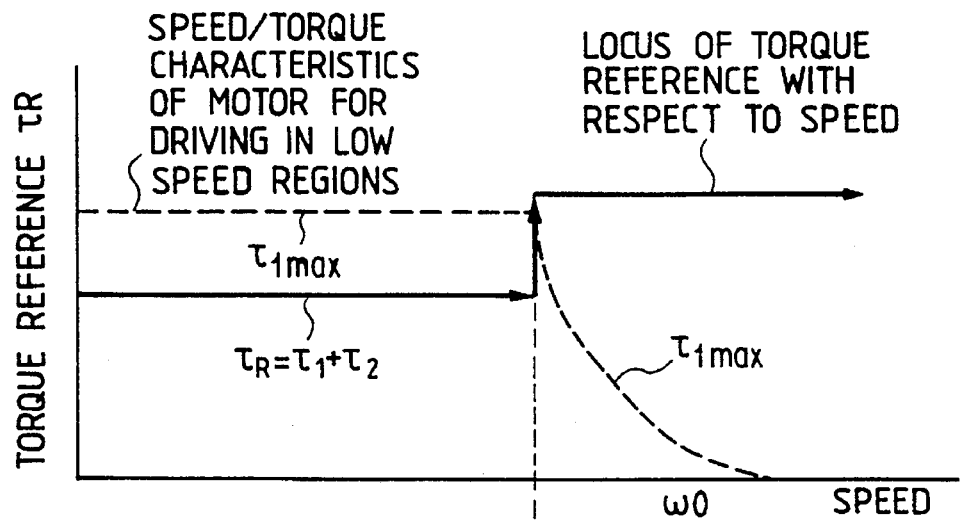
FIG. 9 is a diagram depicting the method of sharing torque between the front and rear wheels in another embodiment of the present invention.
Figure 9B:
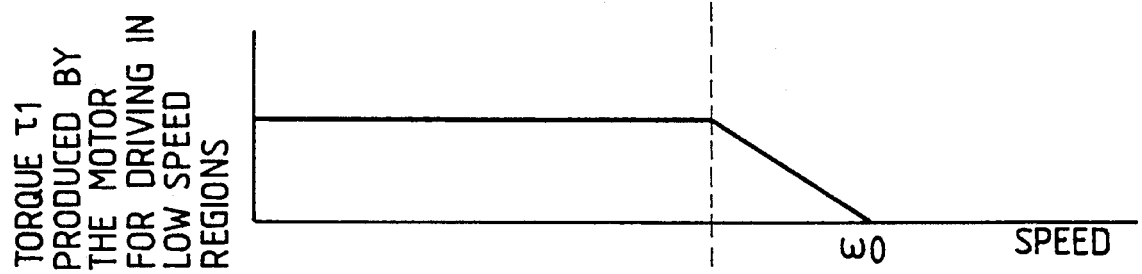
Figure 9C:
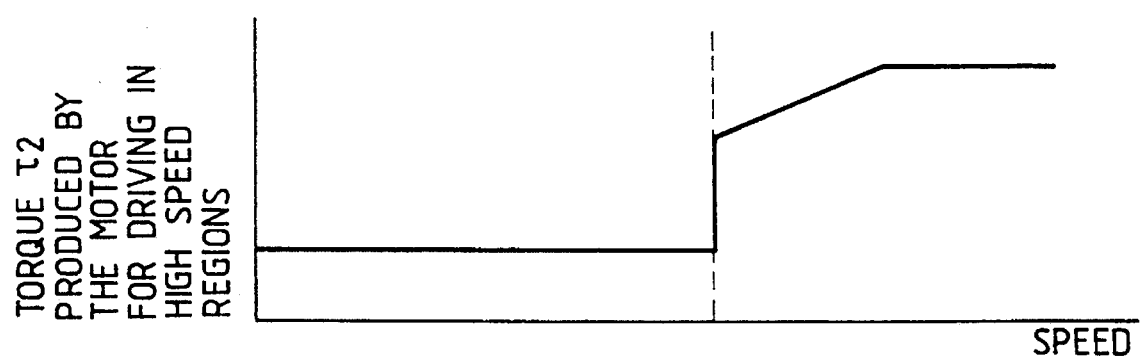

In Examples in FIGS. 4 and 5, torque is produced only by the motor for low speed drive in mode 1. As an alternative method shown in FIG. 9, it is possible to obtain the torque generation sharing rate α corresponding to torque reference τR and to generate torque $\tau_1$ and torque $\tau_2$ separately for the front and rear wheels. As in the case of said mode 2, the motors on the front and rear are used to generate the torque corresponding to torque reference τR. In this case, the important thing is how to determine the percentage of the torque generation to be shared by the motors on the front and rear side.

Figure 10:
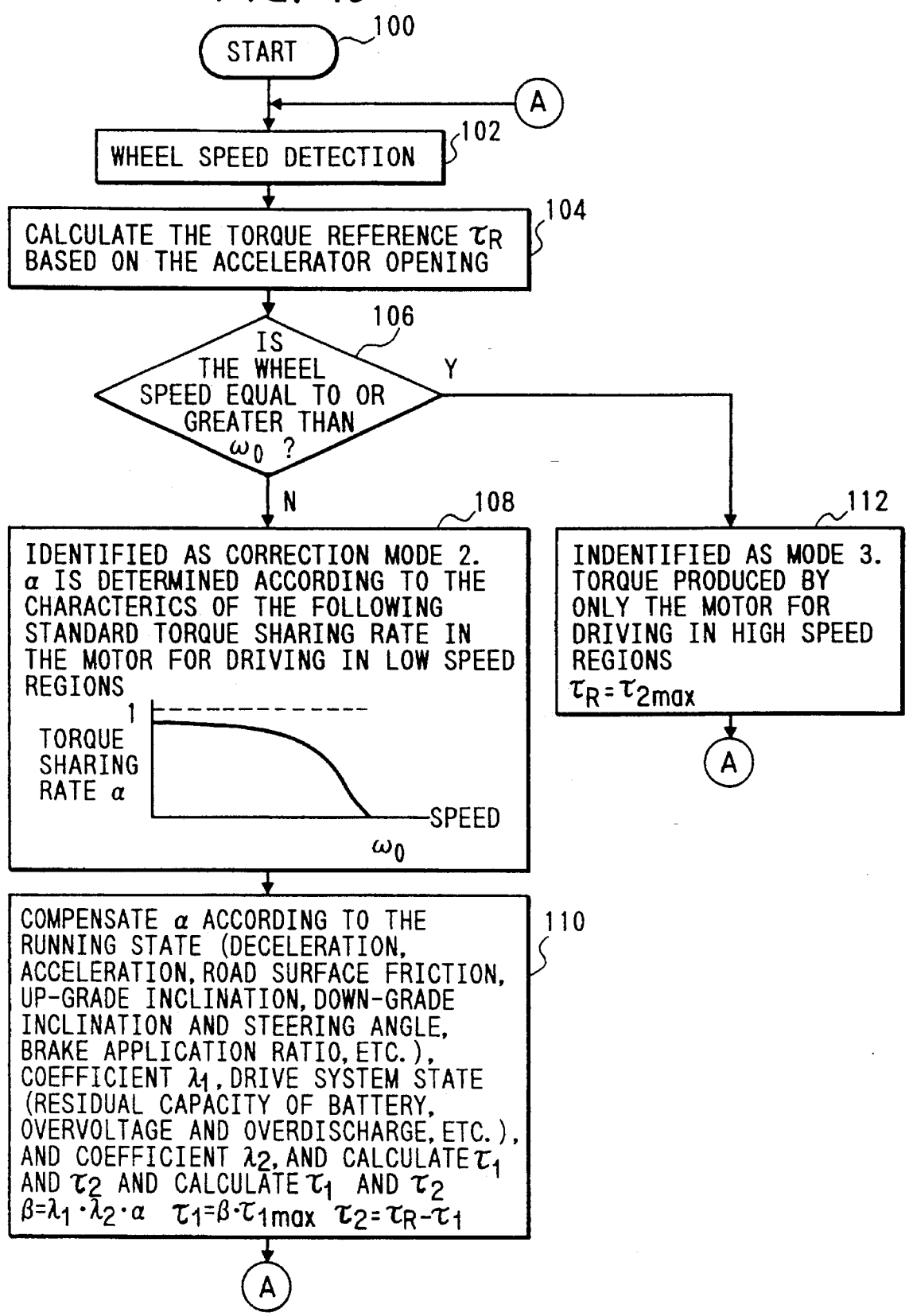
FIG. 10 is a flow chart for processing the torque generation sharing rate in the embodiment given in FIG. 9.

FIG. 10 shows the method of determining said torque generation sharing rate a torque generation, and assigning the torque to be generated by the front and rear wheels, thereby ensuring riding comfort and safety running on muddy roads and roads cover with snow. At first, the vehicle wheel and accelerator opening are detected; then the running state and the drive system state are detected. The running state meant under this context is detected by taking into account the deceleration, acceleration, friction with road surfaces, up-grade and down-grade inclination, steering angle, and brake application ratio. Furthermore, the drive system state is determined by the battery residual capacity, over voltage and over discharge, as well as temperature and over current of the motor and inverter.

The following gives more concrete description with reference to FIG. 10. Firstly, accelerator opening is obtained (102). Based on this value, torque reference τR required at present is obtained (104). Then the system determines whether or not the vehicle speed is equal to or greater than the specified value (the speed at which the torque generated by the motor for low speed drive is zero) (106). When the vehicle speed is below the specified value, the mode will shift to correction mode 2, and the torque generation sharing rate a for the motor for low speed drive is determined by reading it from the memory where it is tabulated in advance as the speed function (108).

The torque generation sharing rate $\alpha$ is the value when the running state and drive system state are standard, and is compensated according to the running state coefficient $\lambda 1$ (an index to represent the running state) and the drive state coefficient $\lambda 2$ (an index to represent the drive state). The $\lambda 1$ and $\lambda 2$ should be determined in advance in relation to the variations in each state. These variations should be tabulated to facility compensation because riding comfort depends on them.

Furthermore, the compensation $\beta$ of torque generation sharing rate $\alpha$ is obtained from the following expression, and torque reference $\tau 1$ and $\tau 2$ of the motors for high and low speed drive are obtained (110).

$$\beta = \lambda 1 \cdot \lambda 1 \cdot \alpha$$

$$\tau 1 = \beta \cdot \tau 1 max$$

$$\tau 2 = \tau R - \tau 1$$

If the value is equal to or greater than the specified level in step 106, the system regards it as corrective mode 3 and cause the torque to be produced only by the motor for high speed drive (112).

Figure 11:
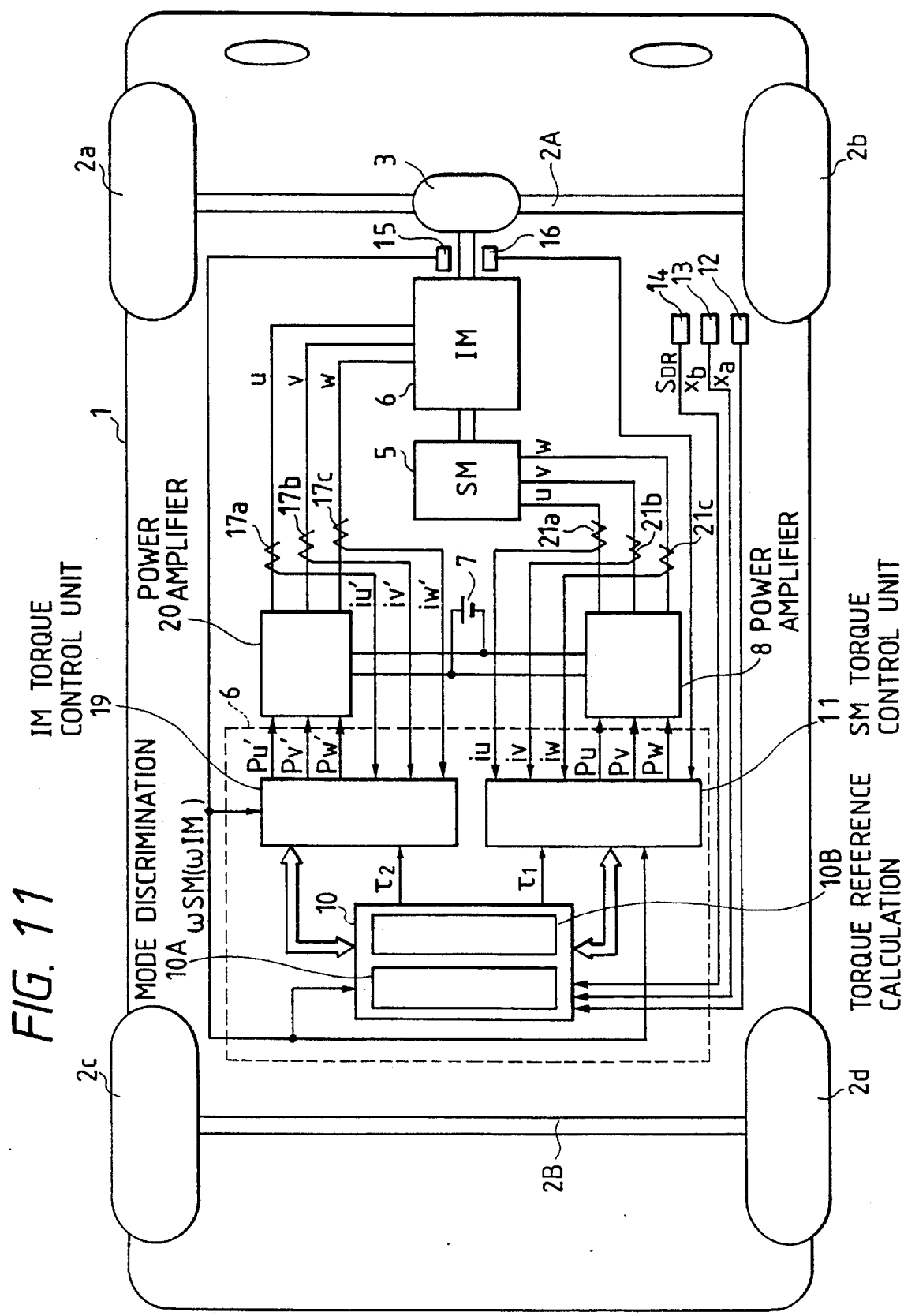
FIG. 11 is an electric vehicle drive system drive circuit diagram in another embodiment of the present invention.

FIG. 11 shows the method of obtaining the motoring power by mounting two motors (permanent magnet synchronous motor 5 and induction motor 6) on the front wheels and by directly coupling the rotors of said motors to said axles. The motor control method is the same as that shown in the embodiment of FIG. 1. It should be noted that the drive source is the same if the motors of this combination are mounted on the rear wheels.

In order to ensure highly efficient drive system, permanent magnet synchronous motor in FIG. 1 may be replaced by the inductor motor having a greater number of poles, and the inductor motor for rear wheel drive may be replaced by that having a smaller number of poles. In order to minimize the curb weight, the capacity of the induction motor having a greater number of poles should be made smaller than that of the induction motor for rear wheel drive, and the base speed of the induction motor on the front wheel should be reduced below that of the induction motor. This will provides the constant torque characteristics through the induction motor for rear wheel drive in the low speed range.

When the vehicle is running at a low speed at the time of traffic congestion, namely when not much motoring force is needed, the motoring force can be provided by the torque which is generated by the induction motor on the front wheel side. Suppose it is necessary to have the drive torque over than generated by the induction motor on the front wheel, this will ensure that the required torque is supplied by the induction motor for rear wheel drive. The drive system in FIG. 1 provides a system permitting the energy-saved running, whereas the drive system according to the present embodiment is composed entirely of induction motors; therefore, high-speed, rigid and economical drive system can be ensured.

Figure 12:
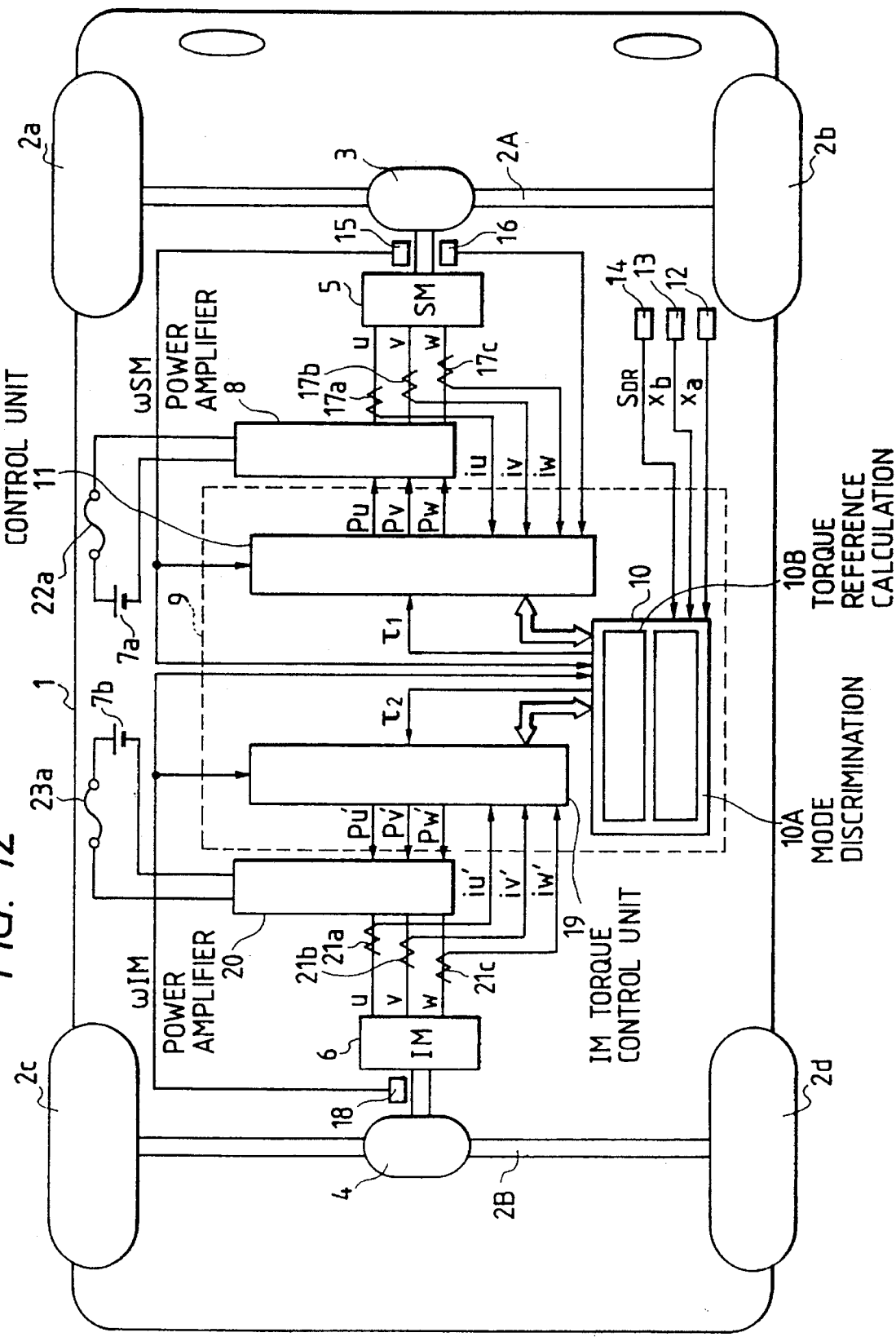
FIG. 12 is an electric vehicle drive system drive circuit diagram in still another embodiment of the present invention.

The embodiment given in FIG. 12 uses the motors of the same type as those given in the embodiment of FIG. 1 to constitute the drive system. This embodiment is different from that in FIG. 1 in that two systems are used to constitute the power supply battery. A high energy density battery is mounted to drive the motor featuring a highly efficient torque generation, for example, the permanent magnet synchronous motor. A high output density battery is installed to drive the motor having a greater output power. The nickel-cadmium nickel-hydrogen and nickel-zinc batteries have greater output density than the lead battery. Batteries having higher energy density includes the sodium-sulfur battery and lithium battery. A combination of high output density battery and high energy density battery should be determined from among these batteries within the practically available range.

There can be other methods of mounting two or more motors of different types on the front and/or rear wheel. For example, DC motor can be mounted to drive the front wheel, and the rear wheel can be driven by the induction motor. In this case, the torque $\tau_{DC}$ of the DC motor is controlled according to the expression (13):

$$\tau_{DC} = K_r \cdot \phi \cdot I_a \quad (13)$$

where K shows torque constant, $\phi$ represents a magnetic flux and $I_a$ denotes armature current. The DC motors are classified into series field DC motor, shunt field DC motor and compound DC motor, depending on field winding method for forming the magnetic flux $\phi$. In any case, the chopper or bridge type power amplifiers are used to control the motor magnetic flux or armature current, and the torque generated by the motor is controlled. This technique will not be described since it is already known.

Furthermore, if power is supplied by the battery through electric insulation as shown in FIG. 12, the drive system can run even during failure—as a new feature in addition to the characteristics of the drive system shown in FIG. 1.

Namely, the batteries are installed to be electrically insulating each other in the embodiment in FIG. 12, as shown in 7a and 7b. Without such mutual isolation, the power device constituting said power amplifiers will be turned on to form a short circuit loop, and then problems has occurred in the system, which whole energy of the batteries is supplied from the batteries to power amplifiers (8 or 20) with the short circuit loop. As a result, the battery power is fed only to the short circuit loop, so power is not fed to the normal drive system (power amplifiers and motors). Therefore, the motor fails to operate.

In even this case, as cited in the explanation of FIG. 1, the short circuit loop may be formed between amplifiers 8 and battery 7a, and between amplifiers 20 and battery 7b. So it is necessary to install breakers 22a, 23a between power amplifiers 8 and battery 7a, and amplifiers 20 and battery 7b, respectively.

It is also necessary to add the mechanism to prevent power from being transmitted in order to ensure that transient brake torque caused by the short circuit loop between power amplifiers 8 and battery 7a, and between amplifiers 20 5 and battery 7b will not be transmitted to the drive gears 2a, 2b, 3c and 2d, when said torque brake has occurred to differential gears 3 and 4 to transmit power of motors 5 and 6.

Addition of said mechanism prevents serious impact from being given to the normal drive system even if a failure has occurred to the drive system, thereby ensuring continued use of the normal drive system.

Figure 13:
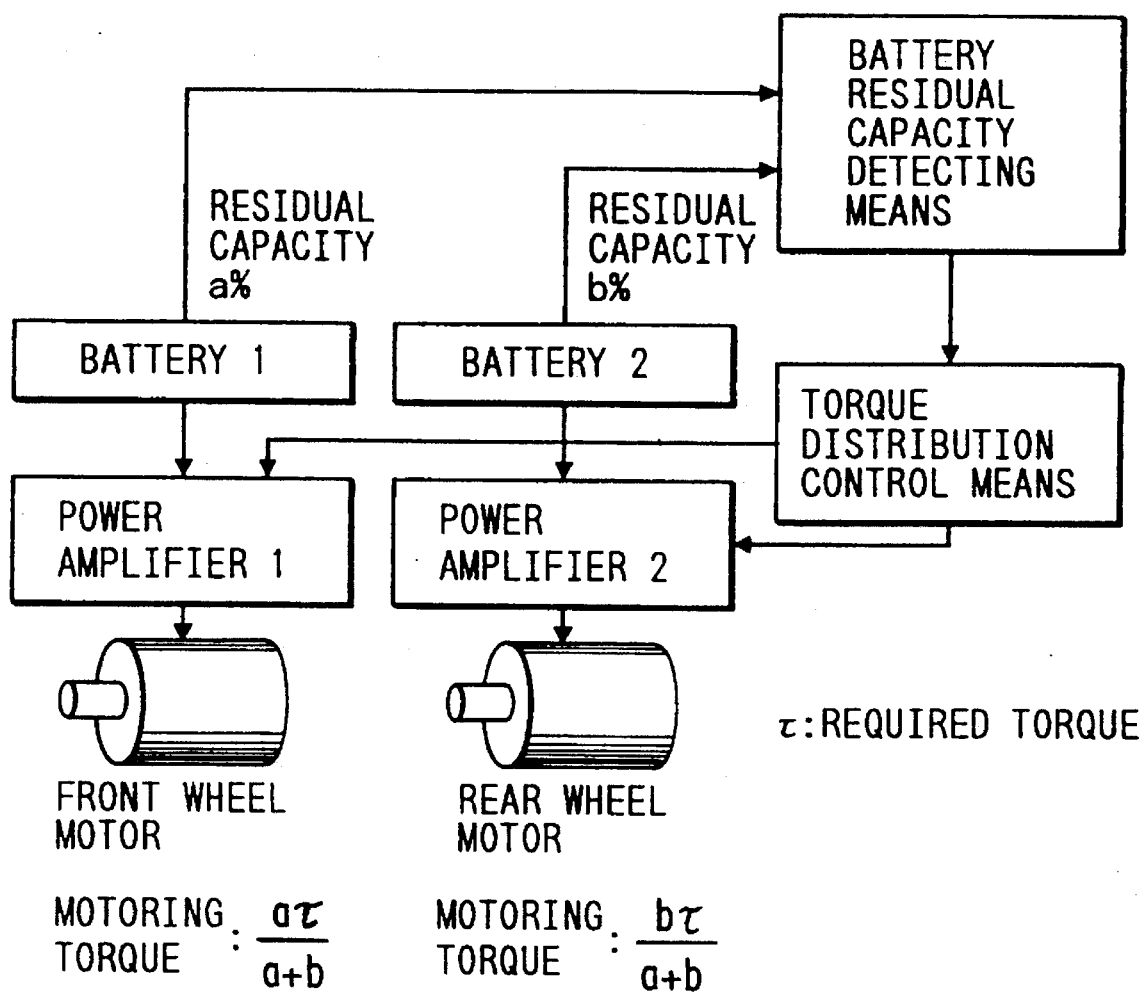
FIG. 13 is a concrete technique to realize the principle of torque sharing.

When there are two battery systems, cruising distance can be extended by changing the distribution of torque according to residual capacity of these batteries. FIG. 13 shows this technique. Here the residual capacity is expressed in terms of the ratio between the value obtained by subtracting the discharged electric energy (Wh) from the fully charged electric energy (Wh), and the fully charged electric energy (Wh). Here the drive torque is assigned to the motor for front wheel drive and the motor for rear wheel drive in proportion to the residual capacity so that the residual capacities of batteries 1 and 2 will uniformly decrease. This allows energies of two batteries to be consumed uniformly, permitting the cruising distance to be extended.

Figure 14:
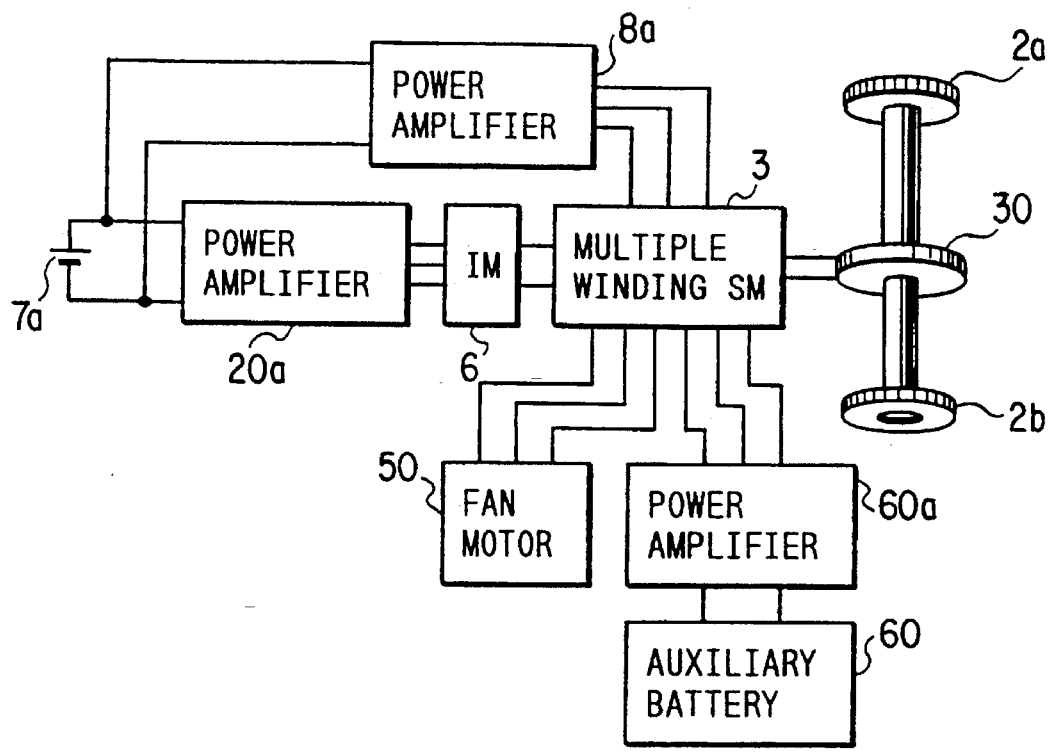
FIG. 14 is an electric supply circuit diagram of the drive system auxiliary device in the embodiment of the present invention.

FIG. 14 shows the embodiment of the induction motor 6 and permanent magnet synchronous motor 5 of multiple winding structure. Battery 7a is connected to power amplifiers 20a and 8a, and each of said power amplifiers 20a and 8a is connected to each phase of two or more primary winding coils of said induction motor 6 and the permanent magnet synchronous motor 5 of multiple winding structure; direct power supply is converted into AC power to drive said motors 6 and 5. The control circuit of this motor can be the one shown in FIG. 1, so it will not be described here. The remaining primary winding coils of the permanent magnet synchronous motor 5 are connected with the electric vehicle auxiliary equipment, for example, the drive power supply of fan drive motor 50 for use inside the vehicle and air conditioner (not illustrated), auxiliary battery to operate illumination and control circuit, and are used as an addition power supply. It should be noted that, when the variable frequency power source is required, inverter/converter composition is to be added as the drive source. Furthermore, when auxiliary battery 60 is to be used as DC power supply for auxiliary equipment(commection is not illustrated), the power amplifier 60a comprising the rectifier and converter is added.

In the drive system, electric vehicle is driven by the torque generated from the induction motor 6 in the high speed range. When said motor 6 has decelerated, surplus rotary energy can be returned to the main battery 7 via power amplifiers 20a and 8a. At the same time, it can be returned to the auxiliary equipment and auxiliary power source such as battery connected to the multiple winding coil of the permanent magnet synchronous motor 5. Namely, since the surplus energy at the time of regeneration produced by motors 6 and 5 can be dissipated, it is used by other equipment as loads, even when the main battery is fully charged and said surplus energy cannot be returned to the battery. In the case, it can be used as power source for the equipment. This ensures constant electric brake performance. Furthermore, even when the supply has become faulty, energy taken from motor 3 can be positively used for replenishing or charging. Thus, these characteristics improve energy utilization rate for the entire system, and at the same time upgrades safety and reliability.

Figure 15:
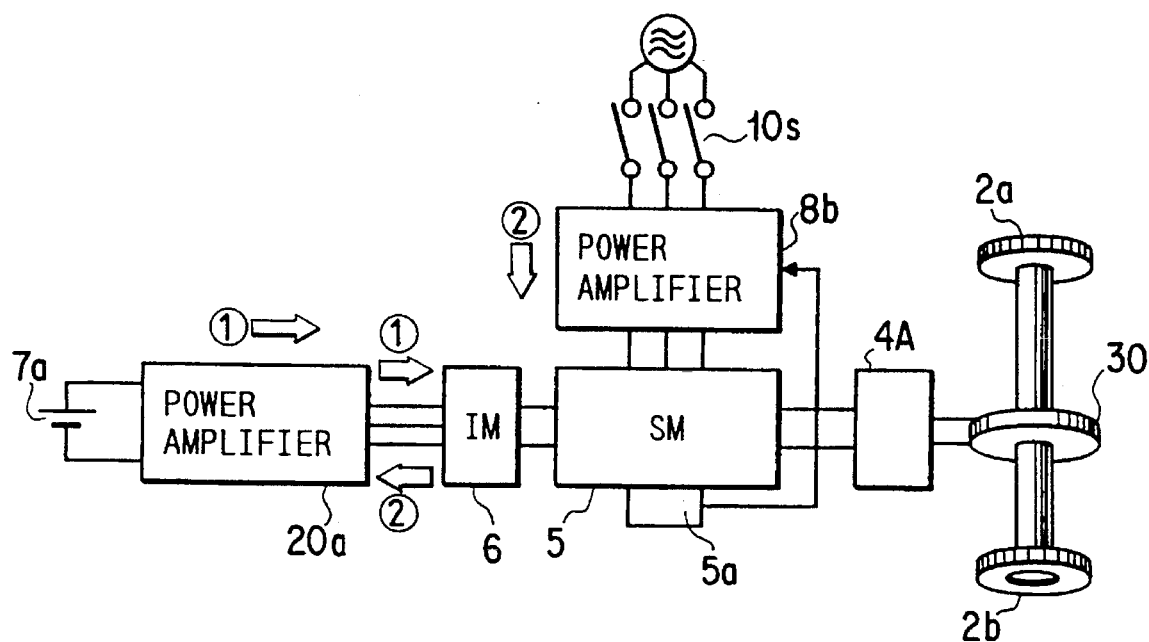
FIG. 15 is a battery charging circuit diagram for the drive system in the embodiment of the present invention.

In addition, when the multiple winding structure motor, for example, the induction motor and synchronous motor are used as different types of motors, it is possible to find a function as a vehicle-mounted charger for main battery 7a. FIG. 15 illustrates its principle. The speed of the induction motor 6 is increased by power amplifier 20a to the synchronous speed when driven by the commercial power source (50/60 Hz), and the synchronous motor 5 is also driven throught the operation.

As a result, induced voltage proportional to said synchronous speed occurs to said synchronous motor 5. In this case, energy of battery 7a flows through route [1]. Under this condition, induction motor speed, namely, frequency reference of power amplifier 20a is controlled so that the phase of said induced voltage will agree with that of the commercial source. When the phase of said induced voltage agrees with the phase of commercial source, switch 10S is turned on, and commercial power is applied to the primary winding of the synchronous motor. Primary current reference signal is formed by using the position detection signal obtained from magnetic pole position detector 5 of synchronous motor 5, and power amplifier 8b comprising the rectifier and inverter is controlled by said current reference signal, thereby driving synchronous motor 5.

As a result, synchronous motor 5 serves as a motor, while said induction motor 6 works as a generator. Here the power amplifier 20a is made to operate as a converter. That is, the induced current having occurred to the primary winding of said induction motor 6 is converted into the DC voltage, and the rotary energy produced by induction motor 6 is returned to battery 7a through passage of route [2], to charge said battery 7a.

This system is insulated from the commercial source by two motors (serving as a rotating transformer); this is also effective for safety.

Contrary to the embodiment shown in FIG. 15, it is also possible to drive the induction motor by the commercial source. In this case, the commercial source is connected to the primary winding of said motor to drive the rotor of the synchronous motor to which the rotor of said induction motor is directly connected. The induced voltage occurring to the primary winding of the synchronous motor is converted by the power amplifier; thus, the rotary energy is regenerated into battery 7a. Moreover, using the induction motor 6 of multiple winding structure, a set of primary windings (for three phases) is connected to the commercial source, and a set of primary winding coils constituting three phases of the remaining winding coils is connected to the power amplifier 20a. The AC induced voltage having occurred to said primary winding is converted into DC voltage, and rotary energy of induction motor is returned for battery 7a for charging.

In both of the last two methods are designed, the induction motor is driven by the commercial source; therefore, the phase of the commercial power at the time of startup and the rotary angle of the rotor need not be synchronized with each other. Therefore, it simplifies the charging operation.

In the drive system shown in FIG. 15, induced voltage is produced on the primary winding by the rotation of the motor. Said induced voltage is converted into DC power by power amplifier (the power amplifier in this case works as a converter), thereby charging the battery 7a. Thus, the motors are made to rotate during charging operation during charging; it is necessary to add the mechanism 4A to disconnect the wheels from the motors so that the motor rotation will not be transmitted to the wheels.

Another charging method by insulation with the commercial source without using rotation is provided by the use of the wound rotor induction motor or reluctance synchronous motor, as one of the combinations of different types of motors. When the induction motor is used, induced voltage having occurred to the secondary circuit, i.e. the rotor is used as power source for other auxiliary equipment during driving. The magnitude of this induced voltage is proportional to the product between the magnetic current and primary frequency. So one of the two should be changed. In this case, the primary frequency is related to the vehicle speed, so it cannot normally be changed for auxiliary equipment. Therefore, the output voltage of the power converter is regulated to control the magnetizing current. During charging, commercial source (single phase) is added to phase U, and the commercial voltage insulated from the phase corresponding to the secondary side should be taken out.

When the reluctance motor is used, the power supply cannot be taken out during driving. When charging with the vehicle stopped, the commercial source (single phase) is added to each phase of U and V, and the insulated AC current can be taken out from phase W. In this case, the operation is not started even when said commercial source is added, because of the synchronous motor. In addition, it is also possible to constitute a transformer using the motor frame as the magnetic circuit.

Figure 16:
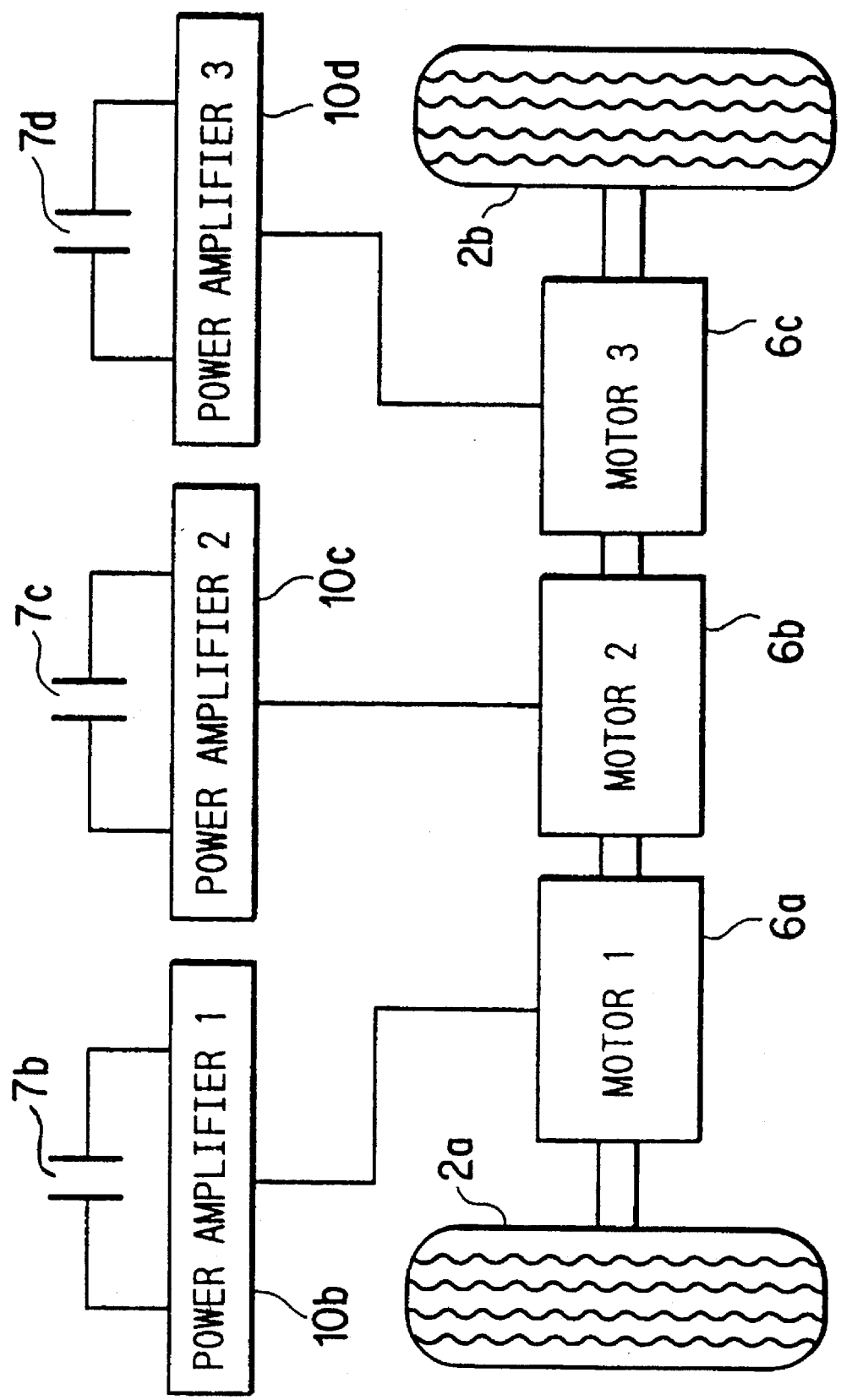
FIG. 16 is a motor layout drawing in still another embodiment of the present invention.

The above description is concerned with the case when two motors of different types are used. When three or more motors of similar types are used, it is possible to constitute a characteristic drive system. FIG. 16 shows the case where the front wheels 2a and 2b are driven by three or more induction motors. Actually, the differential gear is required as illustrated in FIG. 1, but is not described for the brevity of description.

Figure 17:
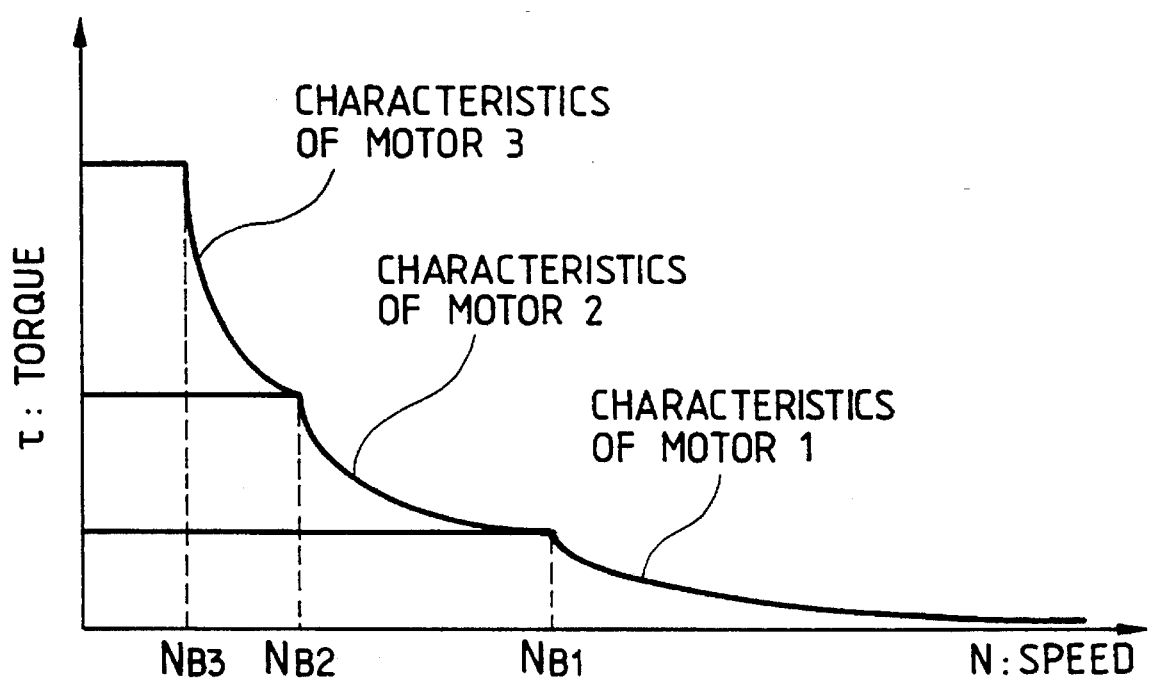
FIG. 17 shows an embodiment of the drive system and motor speed/torque characteristics when two or more different types of motors are used.

As shown in FIG. 17, it is possible to determine the torque capacity so that the output capacity of the motor can be kept constant depending on the selection of base speeds $N_{B1}$, $N_{B2}$ and $N_{B3}$, or to determine various torque characteristics in conformity to the object, without using the speed change gear.

This feature allows the formation of the drive system in conformity to the applications of the systems including the drive system suited to low speed drive, and the drive system suited to high speed drive. As illustrated in FIG. 16, it is also possible to select batteries of different types (7b, 7c and 7d) in conformity to the capacities of motors 1, 2 and 3 for each of power amplifiers 10b, 10e and 10d. In this case, the batteries of low voltage high output power, intermediate voltage intermediate output power, and high voltage low output power can be used as the batteries for motors 1, 2 and 3.

According to the present embodiment, combination of various types of motors compensates for the characteristics among motors;

therefore, despite various changes in running states including acceleration, deceleration, up-hill inclination and down-hill inclination, the maximum performance of the vehicle can be used at all times. Furthermore, even if a trouble has occurred to the drive system (motor plus power amplifier), other normal drive systems ensure continued operation, assuring running safety. The brake force for the front and rear wheels can be changed in conformity to the running state, ensuring always stable electric braking. At the same time, surplus energy can be effectively recovered, thereby expending the running distance for each charge. Moreover, during running, the AC induced voltage produced by motors can be taken out, and said AC voltage can be used as the power source for the auxiliary equipment such as air conditioner and auxiliary batteries. In addition, when the vehicle is stopped, the battery can be changed with the commercial source insulated, and a multi-functional drive system can be achieved;

the optimum drive system can be configured according to the application needs.

The present invention provides an electric vehicle drive system wherein two or more motors of different types are mounted on front and/or rear wheels to determine the ratio of the drive torque required by the electric vehicle to be shared by different types of motors in conformity to the running state so that the torque is produced by each motor at this ratio, thereby ensuring effective generation of torque from the start to the maximum speed, and extended cruising distance and upgraded running performances.

What is claimed is:

1. In an electric vehicle wherein DC power of the vehicle-mounted battery is amplified and is supplied to at least two motors, and the wheels are driven by the torque of said at least two motors to drive the vehicle, an electric vehicle drive system wherein said at least two motors comprise at least two different types of motors, and the system is provided with the control means to adjust the share of the vehicle driving force to be generated by each of said motors in conformity to the running state of said vehicle, wherein front and rear wheels constitute the drive source of said vehicle, and said front and rear wheels are separately driven by said different types of motors.

2. An electric vehicle drive system according to claim 1, wherein said two or more motors comprises a combination of a low speed drive motor and high speed drive motor, a highly efficient motor is used as said low speed motor, while a motor having a greater capacity and greater based speed than said low speed drive motor is used as said high speed drive motor, and the share of the driving force of said vehicle is controlled by said control means such that up to the maximum torque is generated by said low speed drive motor, with the remaining torque generated by said high speed drive motor.

3. An electric vehicle drive system according to claim 1, wherein said two or more motors comprise a combination of a low speed drive motor and high speed drive motor, a highly efficient motor is used as said low speed motor, while a motor having a greater capacity and greater base speed than said low speed drive motor is used as said high speed drive motor, and said control means, using the efficiency map of said motors given in advance, determines the ratio of the force to be provided by said low speed drive motor and that to be provided by said high speed drive motor, and exercises control such that torque is generated by each of said motors based on this ratio.

4. An electric vehicle drive system according to claim 1 wherein a synchronous motor is used as said low speed motor, while an induction motor is used as said high speed drive motor.

5. An electric vehicle drive system according to claim 1 or wherein a DC motor is used as said low speed motor, while an induction motor is used as said high speed drive motor.

6. An electric vehicle drive system according to claim 1 wherein an induction motor having a greater number of poles is used as said low speed motor, while the induction motor having a smaller number of poles is used as said high speed drive motor.

7. An electric vehicle drive system according to claim 1, characterized in that, of said two or more types of motors, at least one type of the motor has multiple winding coils.

8. An electric vehicle drive system according to claim 7 wherein a power amplifier is connected to each terminal of said multiple winding coils, and auxiliary load is connected to at least one said multiple winding coil.

9. An electric vehicle drive system according to claim 7 characterized in that, two or more motors comprise a permanent magnetic synchronous motor using the rotor as permanent magnet and using the armature winding of multiple winding structure, and induction motor, wherein part of the multiple winding coils of said permanent magnetic synchronous motor is used as the armature winding to generate driving torque and induced voltage is taken out of the remaining windings to be used as the power source of said auxiliary load.

10. In an electric vehicle wherein DC power of the vehicle-mounted battery is amplified and is supplied to at least two motors, and the wheels are driven by the torque of said at least two motors to drive the vehicle, an electric vehicle drive system wherein said at least two motors comprise at least two different types of motors having different operation/torque characteristics, and the system is provided with the control means to adjust the share of the vehicle driving force to be generated by each of said motors in conformity to the running state of said vehicle, wherein front and rear wheels constitute the drive source of said vehicle, and said front and rear wheels are separately driven by said different types of motors.

11. An electric vehicle drive system according to claim 10, wherein said two or more motors comprise a combination of a low speed drive motor and high speed drive motor, a highly efficient motor is used as said low speed motor, while a motor having a greater capacity and greater base speed than said low speed drive motor is used as said high speed drive motor, and the share of the driving force of said vehicle is controlled by said control means such that up to the maximum torque is generated by said low speed drive motor, with the remaining torque generated by said high speed drive motor.

12. An electric vehicle drive system according to claim 10, wherein said two or more motors comprise a combination of a low speed drive motor and high speed drive motor, a highly efficient motor is used as said low speed motor, while a motor having a greater capacity and greater base speed than said low speed drive motor is used as said high speed drive motor, and said control means, using the efficiency map of said motors given in advance, determines the ratio of the force to be provided by said low speed drive motor and that to be provided by said high speed drive motor, and exercises control such that torque is generated by each of said motors based on this ratio.

13. An electric vehicle drive system according to claim 10, wherein a synchronous motor is used as said low speed motor, while an induction motor is used as said high speed drive motor.

14. An electric vehicle drive system according to claim 10, wherein a DC motor is used as said low speed motor, while an induction motor is used as said high speed drive motor.

15. An electric vehicle drive system according to claim 10, wherein an induction motor having a greater number of poles is used as said low speed motor, while the induction motor having a smaller number of poles is used as said high speed drive motor.

16. An electric vehicle drive system according to claim 10, characterized in that, of said two or more types of motors, at least one type of the motor has multiple winding coils.

17. In an electric vehicle wherein DC power of the vehicle-mounted battery is amplified and is supplied to at least two motors, and the wheels are driven by the torque of said at least two motors to drive the vehicle, an electric vehicle drive system wherein said at least two motors comprise at least two different types of motors having the same electric magnetic compositions but different capacities, and the system is provided with the control means to adjust the share of the vehicle driving force to be generated by each of said motors in conformity to the running state of said vehicle, wherein front and rear wheels constitute the drive source of said vehicle, and said front and rear wheels are separately driven by said different types of motors.

18. An electric vehicle drive system according to claim 17, characterized in that, of said two or more types of motors, at least one type of the motor has multiple winding coils.

19. In an electric vehicle wherein DC power of the vehicle-mounted battery is amplified and is supplied to at least two motors, and the wheels are driven by the torque of said at least two motors to drive the vehicle, an electric vehicle drive system wherein said at least two motors comprise at least two different types of motors, and the system is provided with the control means to adjust the share of the vehicle driving force to be generated by each of said motors in conformity to the running state of said vehicle, wherein an induction motor having a greater number of poles is used as said low speed motor, while an induction motor having a smaller number of poles is used as said high speed drive motor.

20. In an electric vehicle wherein DC power of the vehicle-mounted battery is amplified and is supplied to at least two motors, and the wheels are driven by the torque of said at least two motors to drive the vehicle, an electric vehicle drive system wherein said at least two motors comprise at least two different types of motors having different operation/torque characteristics, and the system is provided with the control means to adjust the share of the vehicle driving force to be generated by each of said motors in conformity to the running state of said vehicle, wherein an induction motor having a greater number of poles is used as said low speed motor, while an induction motor having a smaller number of poles is used as said high speed drive motor.

21. In an electric vehicle wherein DC power of the vehicle-mounted battery is amplified and is supplied to at least two motors, and the wheels are driven by the torque of said at least two motors to drive the vehicle, an electric vehicle drive system wherein said at least two motors comprise at least two different types of motors, and the system is provided with the control means to adjust the share of the vehicle driving force to be generated by each of said motors in conformity to the running state of said vehicle, wherein, of said at least two types of motors, at least one type of the motor has multiple winding coils, and wherein a power amplifier is connected to each terminal of said multiple winding coils, and an auxiliary load is connected to at least one of said multiple winding coils.

22. In an electric vehicle wherein DC power of the vehicle-mounted battery is amplified and is supplied to at least two motors, and the wheels are driven by the torque of said at least two motors to drive the vehicle, an electric vehicle drive system wherein said at least two motors comprise at least two different types of motors, and the system is provided with the control means to adjust the share of the vehicle driving force to be generated by each of said motors in conformity to the running state of said vehicle, wherein, of said at least two types of motors, at least one type of the motor has multiple winding coils, and wherein the at least two motors comprise a permanent magnetic synchronous motor using the rotor as permanent magnet and using the armature winding of multiple winding structure, and induction motor, wherein part of the multiple winding coils of said permanent magnetic synchronous motor is used as the armature winding to generate driving torque and induced voltage is taken out of the remaining windings to be used as the power source of said auxiliary load.

23. In an electric vehicle wherein DC power of the vehicle-mounted battery is amplified and is supplied to at least two motors, and the wheels are driven by the torque of said at least two motors to drive the vehicle, an electric vehicle drive system wherein said at least two motors comprise at least two different types of motors having different operation/torque characteristics, and the system is provided with the control means to adjust the share of the vehicle driving force to be generated by each of said motors in conformity to the running state of said vehicle, wherein, of said at least two types of motors, at least one type of the motor has multiple winding coils, and wherein a power amplifier is connected to each terminal of said multiple winding coils, and an auxiliary load is connected to at least one of said multiple winding coils.

24. In an electric vehicle wherein DC power of the vehicle-mounted battery is amplified and is supplied to at least two motors, and the wheels are driven by the torque of said at least two motors to drive the vehicle, an electric vehicle drive system wherein said at least two motors comprise at least two different types of motors having different operation/torque characteristics, and the system is provided with the control means to adjust the share of the vehicle driving force to be generated by each of said motors in conformity to the running state of said vehicle, wherein, of said at least two types of motors, at least one type of the motor has multiple winding coils, and wherein the at least two motors comprise a permanent magnetic synchronous motor using the rotor as permanent magnet and using the armature winding of multiple winding structure, and induction motor, wherein part of the multiple winding coils of said permanent magnetic synchronous motor is used as the armature winding to generate driving torque and induced voltage is taken out of the remaining windings to be used as the power source of said auxiliary load.

* * * * *